United States Patent
Urbach et al.

(10) Patent No.: US 8,509,525 B1
(45) Date of Patent: Aug. 13, 2013

(54) CLUSTERING OF FORMS FROM LARGE-SCALE SCANNED-DOCUMENT COLLECTION

(75) Inventors: Shlomo Urbach, Tel Aviv (IL); Eyal Fink, Ramat Gan (IL); Tal Yadid, Tel Aviv (IL); Yuval Netzer, Tel Aviv (IL)

(73) Assignee: Google Inc., Mountain View, CA (US)

( * ) Notice: Subject to any disclaimer, the term of this patent is extended or adjusted under 35 U.S.C. 154(b) by 356 days.

(21) Appl. No.: 13/080,877

(22) Filed: Apr. 6, 2011

(51) Int. Cl.
*G06K 9/62* (2006.01)

(52) U.S. Cl.
USPC ........... 382/159; 382/186; 382/185; 382/181; 382/173; 382/189; 345/435; 345/436; 345/440

(58) Field of Classification Search
CPC ........... G06K 9/00288; G06K 9/2054; G06K 9/4671; G06K 9/468
USPC ................ 382/159, 186, 185, 181, 173, 189, 382/226; 345/435, 436, 440
See application file for complete search history.

(56) References Cited

U.S. PATENT DOCUMENTS

| | | | |
|---|---|---|---|
| 6,222,939 B1 | 4/2001 | Wiskott et al. | |
| 6,272,231 B1 | 8/2001 | Maurer et al. | |
| 6,301,370 B1 | 10/2001 | Steffens et al. | |
| 6,356,659 B1 | 3/2002 | Wiskott et al. | |
| 6,400,374 B2 | 6/2002 | Lanier | |
| 6,466,695 B1 | 10/2002 | Potzsch et al. | |
| 6,563,950 B1 | 5/2003 | Wiskott et al. | |
| 6,580,811 B2 | 6/2003 | Maurer et al. | |
| 6,714,661 B2 | 3/2004 | Buddenmeier et al. | |
| 6,834,115 B2 | 12/2004 | Maurer et al. | |
| 6,917,703 B1 | 7/2005 | Steffens et al. | |
| 6,940,454 B2 | 9/2005 | Paetzold et al. | |
| 7,050,624 B2 | 5/2006 | Dialameh et al. | |
| 7,050,655 B2 | 5/2006 | Ho et al. | |
| 2005/0185060 A1 | 8/2005 | Neven | |
| 2006/0012677 A1 | 1/2006 | Neven et al. | |
| 2006/0050933 A1 | 3/2006 | Adam et al. | |
| 2011/0035406 A1 | 2/2011 | Petrou et al. | |
| 2011/0176737 A1* | 7/2011 | Mass et al. | 382/220 |
| 2011/0270851 A1* | 11/2011 | Mishina et al. | 707/749 |
| 2012/0102033 A1* | 4/2012 | Sarshar et al. | 707/737 |

OTHER PUBLICATIONS

"Cluster analysis," Wikipedia, Last Modified Dec. 2, 2010, 14 pages, [online] [retrieved on Dec. 3, 2010] Retrieved from the internet <URL: http://en.wikipedia.org/wiki/Cluster_analysis>.

"K-nearest neighbor algorithm," Wikipedia, Last Modified Jun. 1, 2011, 4 pages, [online] [retrieved on Jul. 13, 2011] Retrieved from the internet <URL:http://en.wikipedia.org/wiki/K-nearest_neighbor_algorithm>.

(Continued)

*Primary Examiner* — Mike Rahmjoo
(74) *Attorney, Agent, or Firm* — Fenwick & West LLP

(57) ABSTRACT

Techniques for identifying documents sharing common underlying structures in a large collection of documents and processing the documents using the identified structures are disclosed. Images of the document collection are processed to detect occurrences of a predetermined set of image features that are common or similar among forms. The images are then indexed in an image index based on the detected image features. A graph of nodes is built. Nodes in the graph represent images and are connected to nodes representing similar document images by edges. Documents sharing common underlying structures are identified by gathering strongly interconnected nodes in the graph. The identified documents are processed based at least in part on the resulting clusters.

19 Claims, 5 Drawing Sheets

(56) References Cited

OTHER PUBLICATIONS

"Scale-invariant feature transform," Wikipedia, Last Modified Jun. 21, 2011, 15 pages, [online] [retrieved on Jul. 13, 2011] Retrieved from the internet <URL:http://en.wikipedia.org/wiki/Scale-invariant_feature_transform>.

Slawski, B., "Google Acquires Neven Vision: Adding Object and Facial Recognition Mobile Technology," SEO by the Sea, Aug. 15, 2006, 11 pages, [online] [retrieved on Jul. 13, 2011] Retrieved from the internet <URL:http://www.seobythesea.com/2006/08/google-acquires-neven-vision-adding-object-and-fac...>.

* cited by examiner

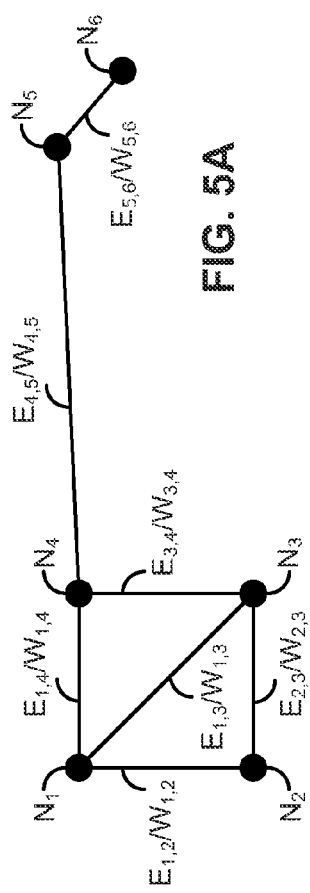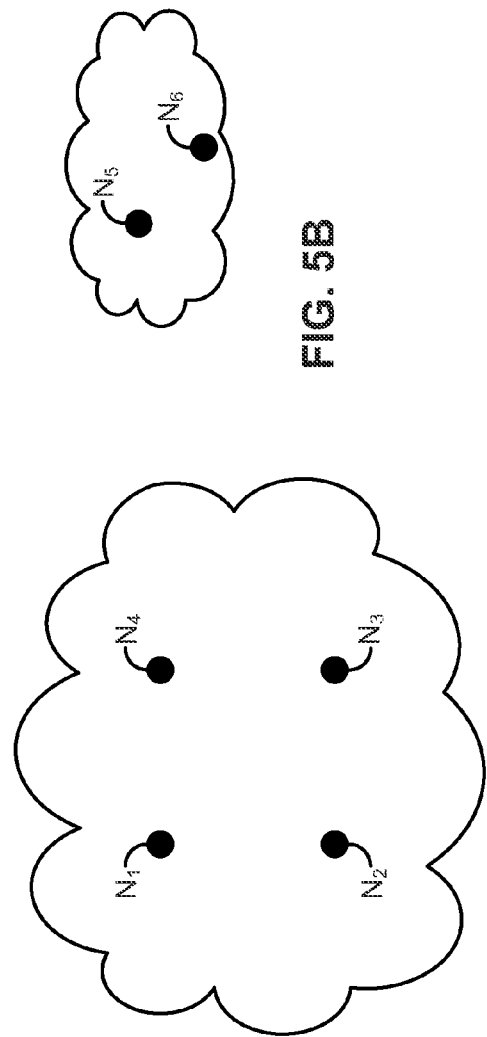

CLUSTERING OF FORMS FROM LARGE-SCALE SCANNED-DOCUMENT COLLECTION

TECHNICAL FIELD

The invention generally relates to the field of image processing, in particular to identifying common underlying structures.

BACKGROUND

Document archives often include instances of the same underlying forms. Examples of such instances include standard governmental documents of a certain country used during a specific time range in the past (e.g., 1930's German birth certificates). Because the underlying form is the same across different instances, knowledge of the form can be exploited when extracting information from the document archive via processing of the forms contained therein. However, there is no known approach that can effectively identify instances of the same forms in a large document collection. Accordingly, there is a need for a way to automatically recognize instances of the same forms in a large document collection.

SUMMARY OF THE INVENTION

In accordance with one aspect of the invention, a computer-implemented method of identifying documents sharing at least one common underlying structure, includes: detecting occurrences of a plurality of predetermined image features in a plurality of document images, in which at least one of the plurality of predetermined image features is common among instances of a form; indexing the plurality of document images in an image index based on the detected image features; building a graph of connected nodes for the plurality of document images by searching the image index, in which nodes representing instances of a predefined document type are connected by lines (also called "edges") in the graph; and identifying the documents sharing common underlying structures using the graph. The above-described computer-implemented method may advantageously be used to identify instances of the same forms in a large document collection.

In accordance with another aspect of the invention, a computer system for identifying documents sharing at least one common underlying structure, includes: a computer-readable storage medium that includes executable computer program code for: detecting occurrences of a plurality of predetermined image features in a plurality of document images, in which at least one of the plurality of predetermined image features is common among instances of a form; indexing the plurality of document images in an image index based on the detected image features; building a graph of connected nodes for the plurality of document images by searching the image index, in which nodes representing instances of a predefined document type are connected by edges in the graph; and identifying the documents sharing common underlying structures using the graph. The above-described computer system may advantageously be used to identify instances of the same forms in a large document collection.

In accordance with still another aspect of the invention, a non-transitory computer-readable storage medium storing executable computer program instructions for identifying documents sharing at least one common underlying structure, the computer program instructions include instructions for: detecting occurrences of a plurality of predetermined image features in a plurality of document images, in which at least one of the plurality of predetermined image features is common among instances of a form; indexing the plurality of document images in an image index based on the detected image features; building a graph of connected nodes for the plurality of document images by searching the image index, in which nodes representing instances of a predefined document type are connected by edges in the graph; and identifying the documents sharing common underlying structures using the graph. The above-described storage medium may advantageously be used to identify instances of the same forms in a large document collection.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF THE DRAWINGS

FIGS. 5A and 5B are diagrams illustrating a weighted graph and a corresponding cluster graph, according to one embodiment of the invention.

DETAILED DESCRIPTION

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Environment

Figure 1:
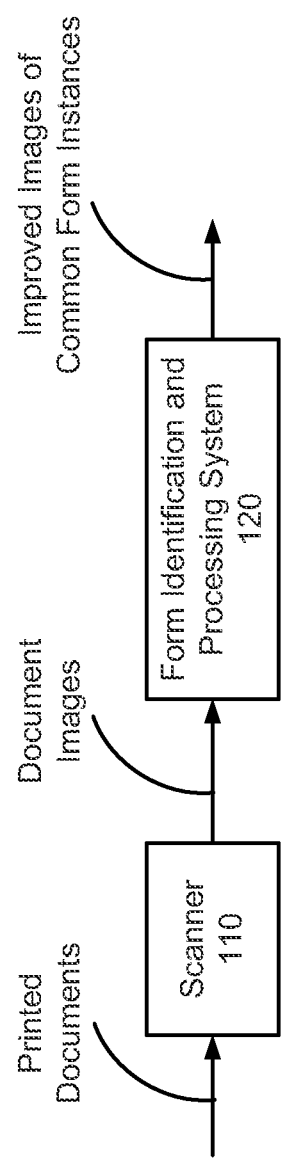
FIG. 1 is a high-level block diagram of a computing environment according to one embodiment of the invention.

FIG. 1 is a high-level block diagram that illustrates a computing environment 100 for identifying documents sharing common underlying structures in a large collection of documents and processing the documents using the identified structures. The common underlying structures include graphical components such as lines, boxes, and logos, and text components such as boilerplate. Example documents sharing common underlying structures include filled (or populated) instances of a same form (e.g., 1930's German birth certificates). For simplicity, documents sharing common underlying structures are also referred to as "common form instances" in the following description. As used herein, the term "common underlying structures" refers to structures which are shared by at least two documents in which the shared structures are determined to be sufficiently similar using a predetermined criterion or predetermined criteria, which include but are not limited to the presence of matching image features. As further described herein, an image feature is an attribute or attributes of a structure in a document image. One skilled in the art would understand that the embodiments described herein may be applied to documents of a variety of predefined document types such as forms. As shown, the computing environment 100 includes a scanner 110 connected with a form identification and processing system 120. Only one instance of the scanner 110 and the system 120 are shown in FIG. 1 for clarity, but those of skill in the art will recognize that multiple scanners 110 and/or systems 120 can be present.

The scanner 110 is a hardware device configured to optically scan a large corpus of printed documents (e.g., books, newspapers) and convert the printed documents to a set of digital images (also called "document images"). The set of document images from the printed document corpus is fed into the form identification and processing system 120.

The form identification and processing system 120 identifies common form instances in the set of document images and processes the document images using the underlying structures of the forms. The system 120 analyzes the document images to detect the presence of a predetermined set of image features that are common or similar among forms, and builds a weighted graph of nodes connected through lines (also called "edges") that describes similarity among the document images. Each node represents a document image and has weighted edges connecting it to other nodes representing similar document images based on matched image features detected therein. The edge weights represent the level of similarity between the document images. The system 120 analyzes the weighted graph to identify clusters of nodes representing common form instances, and optionally uses information present in the clusters to process the document images. The processing can be used to output, for example, a representative image describing the form, an image of the underlying form, and/or text extracted from the form instances. An example architecture and an example methodology of the system 120 are described in detail below.

Computer Architecture

Figure 2:
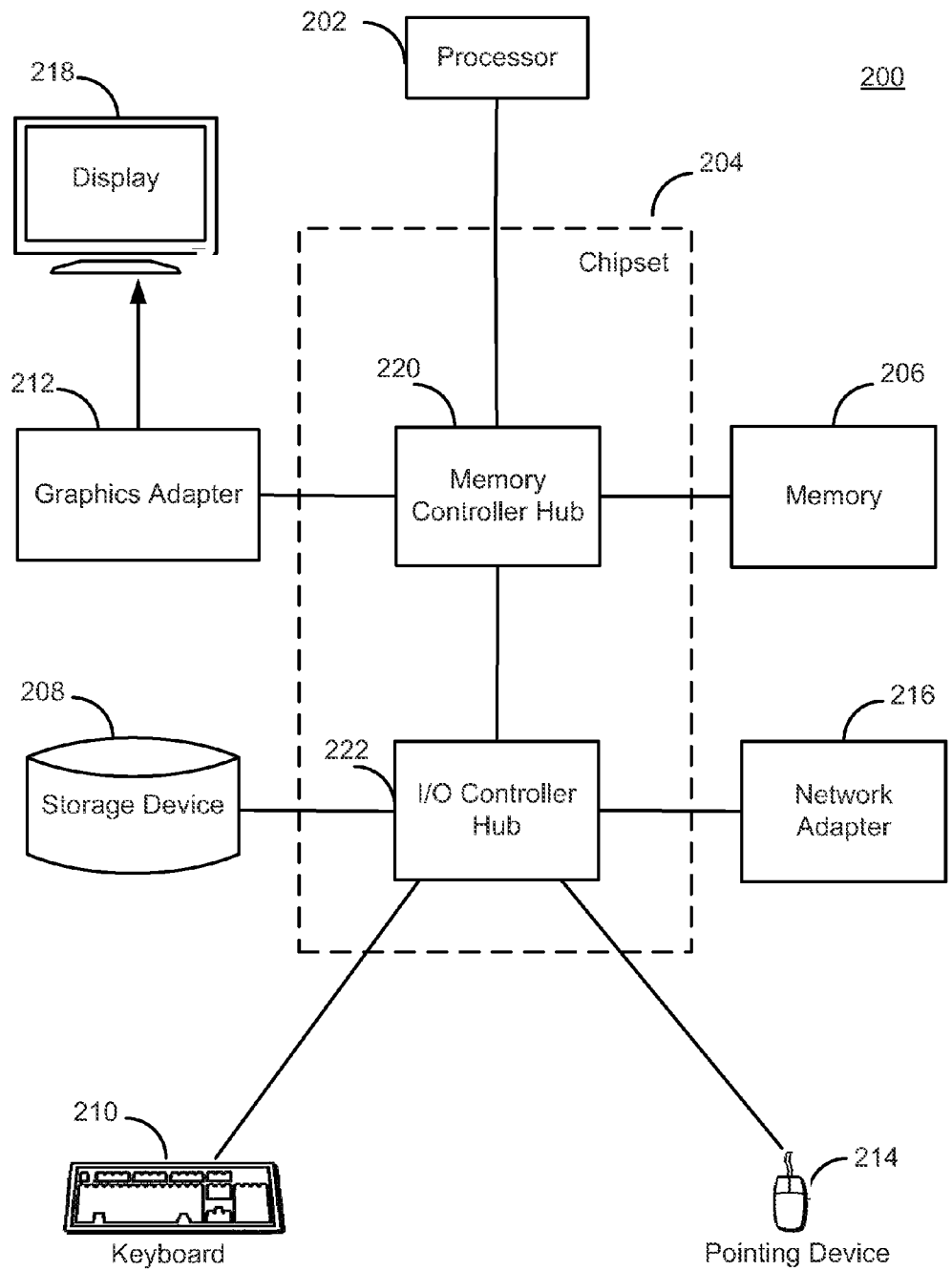
FIG. 2 is a high-level block diagram illustrating an example of a computer for use in the computing environment shown in FIG. 1 according to one embodiment of the invention.

The entities shown in FIG. 1 are implemented using one or more computers. FIG. 2 is a high-level block diagram illustrating an example computer 200. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display 218. The network adapter 216 couples the computer system 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, the form identification and processing system 120 might comprise multiple blade servers working together to provide the functionality described herein. The computers 200 can lack some of the components described above, such as keyboards 210, graphics adapters 212, and displays 218.

Example Architectural Overview of the Form Identification and Processing System

Figure 3:
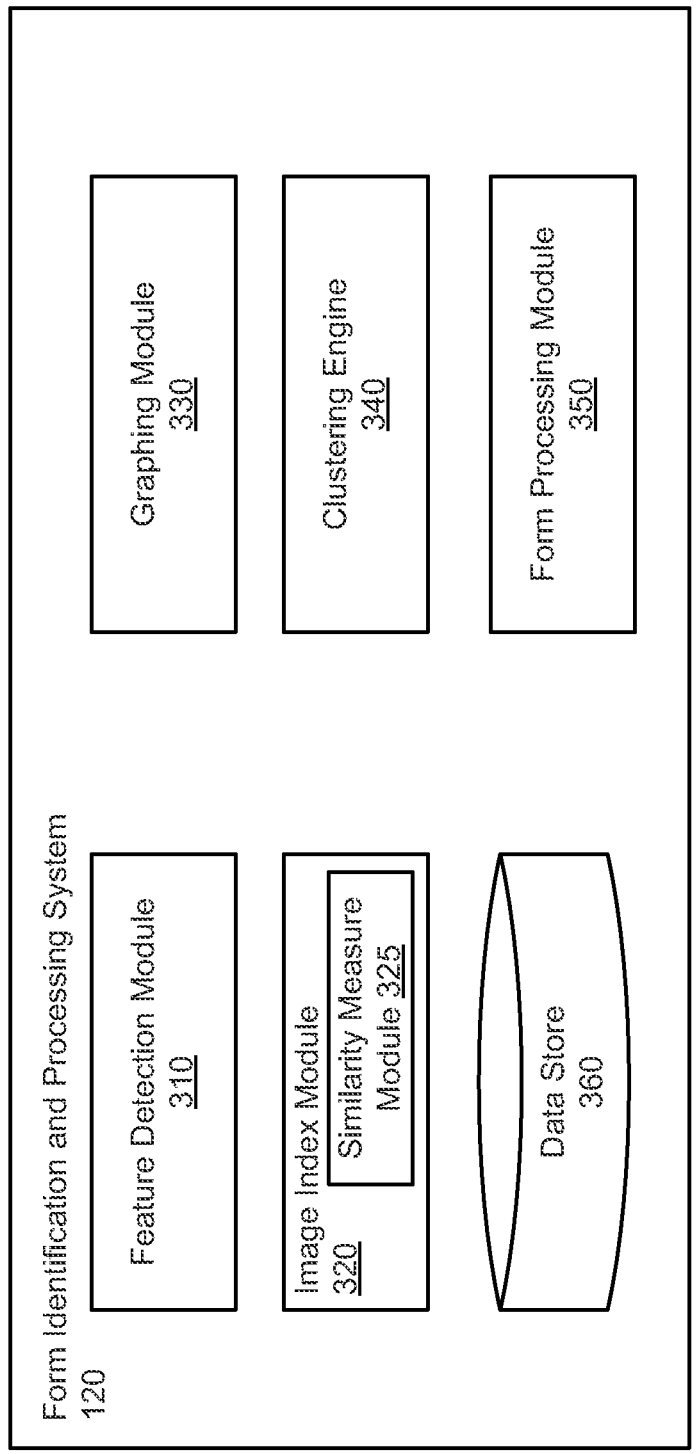
FIG. 3 is a high-level block diagram illustrating modules within a form identification and processing system shown in FIG. 1 according to one embodiment of the invention.

FIG. 3 is a high-level block diagram illustrating a detailed view of modules within the form identification and processing system 120. Some embodiments of the system 120 have different and/or other modules than those described herein. Similarly, the functions can be distributed among the modules in accordance with other embodiments in a different manner than is described herein. As shown, the system 120 includes a feature detection module 310, an image index module 320, a graphing module 330, a clustering engine 340, a form processing module 350, and a data store 360.

The feature detection module 310 detects occurrences of image features in document images and generates descriptions of the detected image features (e.g., orientation, relative position). An image feature is an attribute or a set of attributes relevant for describing content such as a structure in an image. An underlying structure (e.g., a graphical component such as a signature line, a text component such as boilerplate language in a form) may include one or more image features describing various characteristics of the underlying structure. In one embodiment, the module 310 is configured to detect a predetermined set of families of image features that are relevant to distinguishing between forms and other types of documents.

One example family of image features includes stable features that are invariant (or partially invariant) to image parameters such as scale, orientation, illumination, contrast, and image quality. Examples of the stable features include features describing using the Scale-Invariant Feature Transform (SIFT).

Another example family of image features includes features describing line segments found in an image. Forms often contain line segments such as text bounding boxes, signature locations, and checkboxes. In one embodiment, the feature detection module 310 is configured to detect and generate features describing line segments in images satisfying certain criteria, such as having particular orientations (e.g., almost vertical/horizontal) and particular lengths.

Yet another example family of image features includes features describing text phrases recognized in an image along with measurements of bounding boxes (e.g., relative position and size) containing the text phrases. Many form instances will contain text in the same locations. For example, the text can be identical boilerplate text that always appears in the same location in the form instances. The text can also be different text that always appears in approximately the same location, such as text answering questions posed by the form.

In one embodiment, to detect image features, the feature detection module 310 first pre-processes the images to identify text orientation in the images. The module 310 then rotates the images (e.g., by 90°, 180° or 270°) into a standard orientation, such that the text orientation is consistent across the set of images. In one embodiment, the image is rotated to bring the text into the standard reading orientation. The module 310 then detects image features such as those described above in the resulting images using the appropriate techniques (e.g., SIFT algorithm, Optical Character Recognition (OCR) procedures).

The image index module 320 indexes the document images in an image index based on the image features (or combinations of image features) detected therein, such that one can search for document images in the image index based on image features. The image index module 320 supports image lookup for images similar to a given image as measured by the image features. The image index module 320 detects the features of the given image, and then identifies images in the image index that have similar features. In one embodiment, the image index module 320 supports k-nearest-neighbors (kNN) searches (e.g., the image index module 320 returns k images that are more similar to the given image than the other images (also called the "top k images")). To support the kNN searches, the image index module 320 includes a similarity measure module 325 for measuring degrees of similarity among document images by matching image features detected therein, and returning the top k images as search results. The degree of similarity between two images can be measured based on the number or portion of matching image features between the two images. Because the detected image features are relevant for describing structures in document images, matching image features indicate that two images likely have common structures.

In one embodiment, the similarity measure module 325 measures similarity between two images using a similarity distance score representing the similarity of the images based on consideration of one or more image features from the various feature families. In one embodiment, the smaller a similarity distance score, the greater the similarity between the two images. Other embodiments use a similarity distance score where a greater score indicates greater similarity.

For example, the similarity measure module 325 can use a similarity distance score derived from a combination of component scores measuring constituent image features. One component score can be calculated based on the total number (or portion) of matching stable features in the two images, taking into account optimum transformation factors (e.g., allowing scale, shift, and small rotation). Another component score can be based on the total number (or portion) of matching line-segment features. A third component score can be based on the overlap of text phrase collections of the two images. The module 325 can give different image features or feature families different weights that influence the overall affect that the features or families have on the similarity distance score. In one embodiment, the module 325 determines the component scores to use, and the weights for the scores, through direct observation and/or machine learning. For example, a machine-learning engine can be trained using labeled similar/unsimilar image pairs to calculate similarity distance scores for image pairs based on their component scores.

The graphing module 330 builds a weighted graph describing the document images and the similarities among them. One embodiment of the graph includes nodes connected through weighted edges. Each node represents a document image in the image index and has edges connected to nodes representing similar document images. Each edge carries as its weight the similarity distance score between the two document images represented by the connected nodes. In one embodiment, the graphing module 330 builds the weighted graph by first creating nodes representing the indexed document images, and then connecting each node with nodes representing the top k most similar images (e.g., k=100).

The clustering engine 340 analyzes the weighted graph to identify clusters of nodes representing common form instances. A cluster (also called a near-clique) is a set of strongly inter-connected nodes (e.g., nodes having more links among each other than they have with the other nodes). Because only nodes representing similar images are connected and the similarity is based on similarities of predetermined image features common among forms, document images represented by nodes within a cluster are more likely to be images of common form instances as compared to document images represented by nodes of different clusters.

In one embodiment, the clustering engine 340 identifies clusters by building a second unweighted graph, called a "cluster graph." The cluster graph shares the same nodes as the original weighted graph (i.e., the weighted graph built by the graphing module 330) but not the edges in the weighted graph. Any two nodes in the cluster graph are connected if they are connected through a short path (i.e., one or a series of edges) in the weighted graph. Example conditions for a path to qualify as a short path include the total number of hops in the path not exceeding a threshold value, and the total of weights assigned to the edges along the path satisfying another threshold value.

FIG. 5A illustrates a weighted graph of 6 nodes $N_1$ through $N_6$ connected through edges $E_{i,j}$ with various weights $W_{i,j}$ and FIG. 5B illustrates a corresponding exemplary cluster graph according to a set of example conditions. The example conditions applied to build the exemplary cluster graph include, for a path to qualify as a short path, the total number of hops must be no more than 3 and the total of weights along the path must be smaller than a value that is smaller than the weight assigned to the edge between $N_4$ and $N_5$).

Once the cluster graph is built, the clustering engine 340 applies graph-based clustering algorithms to gather nodes in the cluster graph into clusters. The clustering engine 340 may optionally verify the resulting clusters by measuring the distance (e.g., the similarity distance score) between any two nodes within a same cluster. The clustering engine 340 may also measure the distance of images from different clusters to find nearby clusters and optionally merge them. The clustering engine 340 may also provide the resulting clusters to human operators for quality control and/or labeling. The clustering engine 340 may be configured to identify multiple hierarchies of clusters. For example, a higher level cluster may include instances of a particular U.S. government immigration form (e.g., the Arrival-Departure Records), and multiple lower level sub-clusters within the higher level cluster may include instances of that form in different languages (e.g., the Arrival-Departure Records in English, Spanish, Chinese, etc.).

In an alternative embodiment, instead of (or in addition to) the weighted graph and the cluster graph, the graphing module 330 is configured to represents the images as points in a k-dimensional space based on the image features detected therein. The clustering engine 340 is configured to apply corresponding known clustering techniques to gather these points in the k-dimensional space.

The form processing module 350 processes the document images using the image features and identified clusters. As illustrated through various non-limiting examples discussed below, the module 350 can process the document images using a variety of different techniques and for a variety of different purposes. In general, each type of processing exploits the identified clusters and/or image features to produce results that are not possible or not as efficiently derived in the absence of such cluster or feature information.

In one embodiment, the form processing module 350 processes the document images to identify a set of representative images for forms contained in the document corpus. To perform this type of processing for a form, an embodiment of the module 350 analyzes a cluster in the cluster graph containing nodes representing document images of instances of the form to identify one or more nodes in the cluster as representative of the cluster. The module 350 can identify a representative node by, for example, identifying a node with the highest number of edges in the cluster. The document image of this node is representative of the document images represented in the cluster.

The form processing module 350 can use the set of representative images for further processing (e.g., associating, labeling) of document images. For example, when new document images are received, the module 350 can classify the new document images as given form instances by comparing the new images with the set of representative images and classifying the new images as being the same type of form as the closest-matching representative image. Further, the module 350 can recognize new document images that do not closely-match representative images in the set as representing possible new forms.

In another embodiment, the form processing module 350 uses the document images within a cluster to reproduce the form from which the form instances are derived. For example, the module 350 can process the document images in the cluster to identify the aspects of the images that are common to all, or a majority, of the form instances, and establish these aspects as being part of the base form. The module 350 can additionally use the reproduced form to perform further processing of the document images within the cluster to extract variable text from the form instances, recognize boilerplate text in the form, etc. The text in the form and form instances can then be further processed for purposes such as allowing textual searching within the form instances. Additionally or alternatively, the module 350 can remove the common aspects (e.g., common image features) from the document images in the cluster, such that the resulting images only contain image features that are not shared by other images in the cluster. The module 350 can then process the resulting images to detect information unique to the document images (e.g., recognizing text unique to an instance of the underlying form).

The form processing module 350 can also process the form instances by using the reproduced form to improve the quality of the form instances. The module 350 can use the reproduced form to identify components in the form instances that are of highest quality, and then augment the other form instances using these high-quality components. For example, the module 350 can identify a form instance that has a high-quality version of a boilerplate section (e.g., a version free from scanning artifacts that are present in other form instances) and overlay this boilerplate section on other instances of the form that are displayed to a viewer. The module 350 can also insert text or other components extracted from the high-quality version into other form instances, thereby providing improved searching capacity for the form instances having the components.

The data store 360 stores data used by the form identification and processing system 120. Examples of such data include but are not limited to the document images, the detected image features, the image index, the weighted graph, the cluster graph, and the reproduced underlying forms. The data store 350 may be a relational database or any other type of database. Portions of the data store 360 may be stored temporarily or permanently in main memory (RAM) across one or more computers in the computing environment 100.

Overview of Methodology for the Form Identification and Processing System

Figure 4:
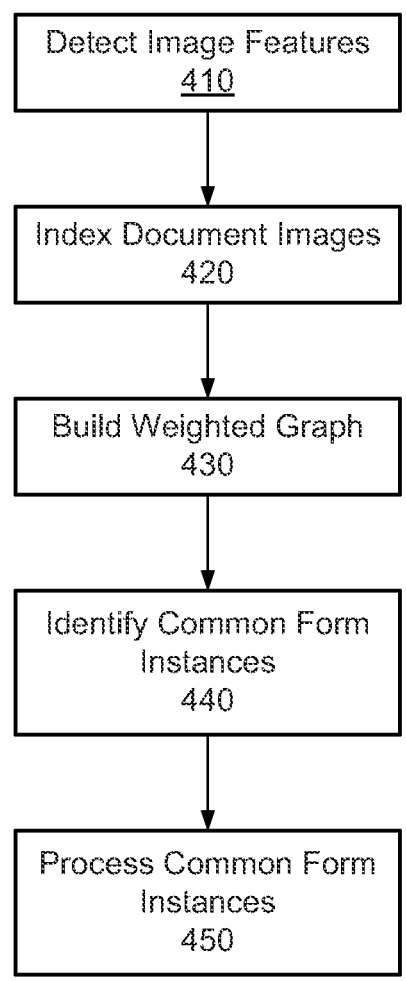
FIG. 4 is a flow diagram illustrating a process for identifying documents sharing common underlying structures in a large collection of documents and processing the documents using the identified structures, according to one embodiment of the invention.

FIG. 4 is a flow diagram illustrating a process 400 for identifying documents sharing common underlying structures in a large collection of documents and processing the documents using the shared structures. Other embodiments can perform the steps of the process 400 in different orders. Moreover, other embodiments can include different and/or additional steps than those described herein.

In step 410, the system 120 detects the presence of a plurality of predetermined image features that are common among forms in the document images. Examples of the image features include SIFT features, line segments, and recognized text phrases. In step 420, the system 120 indexes the document images in an image index based on the image features detected therein, and in step 430 builds a weighted graph of nodes representing the indexed images and connected to nodes representing the top k most similar images measured based on matching image features.

In step 440, the system 120 identifies common form instances by building a cluster graph based on the weighted graph, classifying nodes in the cluster graph into clusters, and identifying document images represented in a same cluster as instances of a common form. In step 450, the system 120 processes the common form instances based on the identified clusters. For example, the system 120 identifies a set of representative images for the identified form instances and/or improves the quality of the form instances using high quality components identified among the form instances.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for identifying documents sharing common underlying structures in a large collection of documents and processing the documents using the identified structures. Thus, while particular embodiments and applications have been illustrated and described, it is to be understood that the present disclosure is not limited to the precise construction and components disclosed herein and that various modifications, changes and variations which will be apparent to those skilled in the art may be made in the arrangement, operation and details of the method, system, and storage medium disclosed herein without departing from the spirit and scope as defined in the appended claims.

What is claimed is:

1. A computer-implemented method of identifying documents sharing a common underlying structure, comprising:
   detecting occurrences of a plurality of predetermined image features in a plurality of document images, wherein at least one of the plurality of predetermined image features is common among instances of a form;
   indexing the plurality of document images in an image index based on the detected image features;
   building a graph of connected nodes for the plurality of document images by searching the image index;
   identifying the documents sharing the common underlying structure using the graph;
   reproducing the common underlying structure shared by the identified documents; and
   generating improved images of the identified documents by overlaying the reproduced common underlying structure on document images of the identified documents.

2. The method of claim 1, wherein the graph comprises a weighted graph and edges in the weighted graph are assigned weights measuring similarities between document images represented by nodes connected by the edges.

3. The method of claim 2, wherein a weight assigned to an edge in the weighted graph comprises a combination of component scores measuring similarities between image features detected in images represented by nodes connected by the edge, and the method further comprises:
   training a machine-learning engine using labeled image pairs; and
   generating the combination of component scores by the machine-learning engine based on the component scores.

4. The method of claim 1, wherein the plurality of predetermined image features comprises one or more of the following:
   stable features that are at least partially invariant to one or more of the following:
      scale, orientation, illumination, contrast, and image quality;
   line segments detected in the document images; and
   text phrases recognized in the document images.

5. The method of claim 1, wherein the identifying comprises:
   gathering nodes in the weighted graph into one or more clusters of strongly inter-connected nodes; and
   identifying document images represented by nodes in a same cluster as documents sharing the common underlying structure.

6. The method of claim 5, wherein nodes having more links among each other than they have with other nodes are gathered into a same cluster.

7. The method of claim 5, further comprising:
   building a cluster graph sharing the same nodes as the weighted graph;
   connecting two nodes in the cluster graph based on (1) whether the two nodes are connected in the weighted graph through a path, (2) a comparison of a total number of hops in the path and a first threshold value, and (3) a comparison of a sum of weights assigned to edges along the path and a second threshold value; and
   gathering the nodes in the cluster graph into one or more clusters based at least on connectivity among the nodes in the cluster graph.

8. The method of claim 5, further comprising:
   identifying a representative document image for the one or more clusters;
   indexing the representative document images in a classification index; and
   labeling documents sharing the common underlying structure in a second plurality of document images by searching the second plurality of document images in the classification index for similar document images.

9. The method of claim 1, further comprising:
   recognizing text in the reproduced common underlying structure shared by the identified documents; and
   augmenting the identified documents using the text recognized in the reproduced common underlying structure.

10. The method of claim 1, further comprising:
   removing the common underlying structure from an identified document to generate a resulting image; and
   processing the resulting image to detect information unique to the identified document.

11. A computer system for identifying documents sharing a common underlying structure, comprising:
   a non-transitory computer-readable storage medium comprising executable computer program code for:
      detecting occurrences of a plurality of predetermined image features in a plurality of document images, wherein at least one of the plurality of predetermined image features is common among instances of a form;
      indexing the plurality of document images in an image index based on the detected image features;
      building a graph of connected nodes for the plurality of document images by searching the image index;
      identifying the documents sharing the common underlying structure using the graph;
      reproducing the common underlying structure shared by the identified documents; and generating improved images of the identified documents by overlaying the reproduced common underlying structure on document images of the identified documents; and a processor for executing the computer program code.

12. The system of claim 11, wherein the graph comprises a weighted graph and edges in the weighted graph are assigned weights measuring similarities between document images represented by nodes connected by the edges.

13. The system of claim 12, wherein a weight assigned to an edge in the weighted graph comprises a combination of component scores measuring similarities between image features detected in images represented by nodes connected by the edge, and the computer-readable storage medium further comprises executable computer program code for:
- training a machine-learning engine using labeled image pairs; and
- generating the combination of component scores by the machine-learning engine based on the component scores.

14. The system of claim 11, wherein the plurality of predetermined image features comprises one or more of the following:
- stable features that are at least partially invariant to one or more of the following:
  - scale, orientation, illumination, contrast, and image quality;
- line segments detected in the document images; and
- text phrases recognized in the document images.

15. The system of claim 11, wherein the identifying comprises:
- gathering nodes in the weighted graph into one or more clusters of strongly inter-connected nodes; and
- identifying document images represented by nodes in a same cluster as documents sharing the common underlying structure.

16. A non-transitory computer-readable storage medium storing executable computer program instructions for identifying documents sharing at least one a common underlying structure, the computer program instructions comprising instructions for:
- detecting occurrences of a plurality of predetermined image features in a plurality of document images, wherein at least one of the plurality of predetermined image features is common among instances of a form;
- indexing the plurality of document images in an image index based on the detected image features;
- building a graph of connected nodes for the plurality of document images by searching the image index, wherein nodes representing instances of a predefined document type are connected by edges in the graph;
- identifying the documents sharing the common underlying structure using the graph;
- reproducing the common underlying structure shared by the identified documents; and
- generating improved images of the identified documents by overlaying the reproduced common underlying structure on document images of the identified documents.

17. The storage medium of claim 16, wherein the graph comprises a weighted graph and edges in the weighted graph are assigned weights measuring similarities between document images represented by nodes connected by the edges.

18. The storage medium of claim 17, wherein a weight assigned to an edge in the weighted graph comprises a combination of component scores measuring similarities between image features detected in images represented by nodes connected by the edge, and the computer program instructions further comprise instructions for:
- training a machine-learning engine using labeled image pairs; and
- generating the combination of component scores by the machine-learning engine based on the component scores.

19. The storage medium of claim 16, wherein the plurality of predetermined image features comprises one or more of the following:
- stable features that are at least partially invariant to one or more of the following:
  - scale, orientation, illumination, contrast, and image quality;
- line segments detected in the document images; and
- text phrases recognized in the document images.

* * * * *

UNITED STATES PATENT AND TRADEMARK OFFICE
CERTIFICATE OF CORRECTION

PATENT NO. : 8,509,525 B1
APPLICATION NO. : 13/080877
DATED : August 13, 2013
INVENTOR(S) : Shlomo Urbach et al.

Page 1 of 1

It is certified that error appears in the above-identified patent and that said Letters Patent is hereby corrected as shown below:

In the Claims:

Column 11, line 40, after "documents sharing," delete "at least one".

Signed and Sealed this
Fourteenth Day of April, 2015

Michelle K. Lee
*Director of the United States Patent and Trademark Office*